May 28, 1968 W. H. E. WIDL 3,386,051

MEANS FOR GRADUALLY SWITCHING CAPACITOR INTO AND OUT OF VARIABLE FREQUENCY OSCILLATOR

Filed Nov. 30, 1966

INVENTOR.
Walter Herbert Erwin Widl

BY Hane and Nydick
Attorneys

United States Patent Office 3,386,051

Patented May 28, 1968

3,386,051

MEANS FOR GRADUALLY SWITCHING CAPACITOR INTO AND OUT OF VARIABLE FREQUENCY OSCILLATOR

Walter Herbert Erwin Widl, Bandhagen, Sweden, assignor to Telefonaktiebolaget L M Ericsson, Stockholm, Sweden, a corporation of Sweden Filed Nov. 30, 1966, Ser. No. 598,041

Claims priority, application Sweden, Dec. 22, 1965, 16,670/65

9 Claims. (Cl. 331—117)

ABSTRACT OF THE DISCLOSURE

An apparatus for changing the frequency of oscillation of a parallel L, C tank circuit which apparatus includes a capacitor having one terminal connected to one terminal of the tank circuit and a switching device for controllably connecting the other terminal of the capacitor to the other terminal of the tank circuit. The switching device includes a switching transistor whose base terminal receives an integrated DC switching voltage upon which is superimposed a high frequency AC voltage. The transistor conducts only when the sum of DC switching voltage and the AC voltage exceed the emitter-base bias of the transistor.

The present invention refers to a method for changing the frequency of an oscillating circuit and a circuit arrangement for realizing the method by connecting to and disconnecting from the oscillating circuit a reactance element e.g. a capacitance by means of a contact arrangement.

In, for example, signal conversion equipment for parallel transmission, oscillators are used for generating one out of four possible frequencies. The frequency is changed by connecting or disconnecting a capacitor to a frequency-determining oscillation circuit. When connecting the capacitor the oscillation in the circuit will be disturbed due to the charging of the capacitor. At the instant of connection both the frequency and the phase of the voltage generated by the oscillating circuit are changed. This abrupt change of phase causes a wide band frequency spectrum, which in its turn causes a so-called jitter in the parallel signal receiver. These inconveniences may be reduced either by a suitable filtering of the output voltage from the oscillating circuit or by connecting the capacitor to the oscillating circuit as continuously as possible. To solve these problems the capacitor has for instance been replaced by an inductance or a voltage feedback has been introduced to prevent the appearance of disturbing transients.

One object of the present invention is to provide a special design of the contact function of the arrangement for connecting the capacitor in order to obtain a continuous connection of the same. The method of the invention is mainly characterized by the fact that during the connection and disconnection of the capacitor, the contact arrangement is operated by a signal of a frequency much larger than the resonant frequency of the oscillation circuit, whereby within each signal period the relation between the time of closure and the time of interruption of the contact arrangement will be increased successively from a small value to a great value during the connecting operation and is decreased from a great value to a small value during the disconnection operation.

Figure 1:
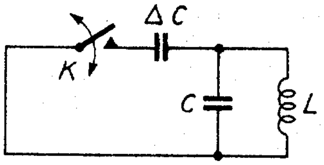
Figure 2:
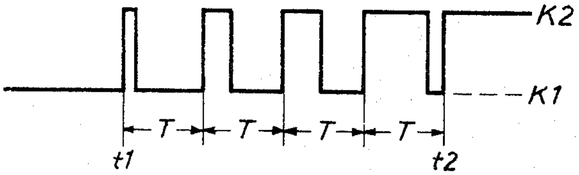
Figure 3:
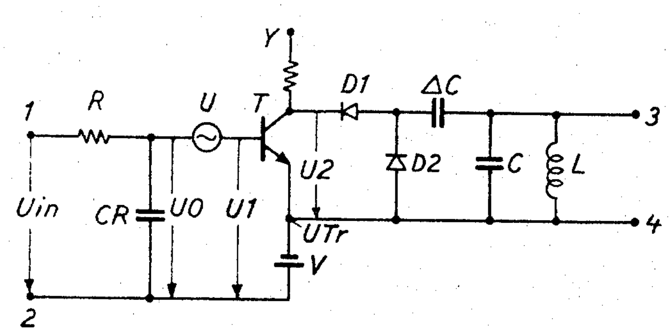
Figure 4A:
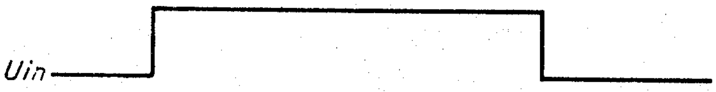
Figure 4B:
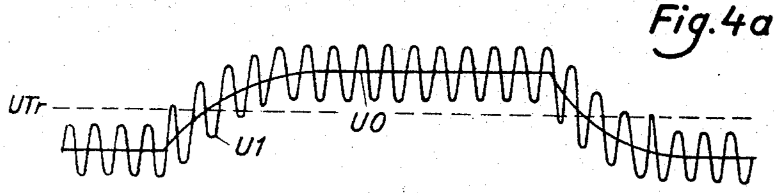
Figure 4C:
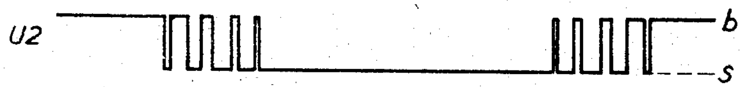

The invention will be further described with reference to the accompanying drawing, wherein FIG. 1 shows an oscillation circuit with an additional capacitor for connection to the circuit, FIG. 2 shows in principle the contact function of the connection arrangement according to the invention, FIG. 3 shows an embodiment of the connection arrangement for realizing the method according to the invention and FIGS. 4*a*, 4*b* and 4*c* show curves of the voltages at different points of the arrangement according to FIG. 3.

FIG. 1 shows an oscillation circuit including an inductor L and a capacitor C. To this oscillation circuit an additional capacitor ΔC may be connected by means of the contact device K to change the frequency. The functioning of the contact device K is shown in FIG. 2. The contact has a closed position K2 and an open position K1. The additional capacitance ΔC is connected during the time interval $t1$–$t2$. During this time interval the contact device K effectuates a number of oscillations with the frequency $1/T$, this frequency being much higher than the resonant frequency of the oscillation circuit L, C. Within each period T of this oscillation the relation between the time of closure and the time of interruption of the contact arrangement is varied successively from a small value at the beginning of the time interval to a great value at the end of the time interval. The capacitor ΔC will thus be charged slowly. Therefore, an abrupt interference of the oscillation of the oscillating circuit is avoided. If, on the contrary, the capacitor is to be disconnected, the relation between the time of closure and the time of interruption of the contact arrangement is changed from a great to a small value.

To obtain this special function of the contact arrangement a circuit arrangement according to FIG. 3 may be used. The arrangement comprises the input terminals 1, 2 and the output terminals 3, 4. To the latter the oscillation circuit L, C is connected and to the terminal 3 the additional capacitor ΔC is connected. To the input terminals 1, 2 is connected an integrating low-pass filter consisting of the resistance R and the capacitor CR. To the low-pass filter an alternating voltage source U is connected, which source emits a signal of af requency much higher than the resonant frequency of the oscillation circuit. To the alternating voltage source U is connected a connection element in form of a transistor T. The transistor receives operating voltages to the collector via a resistor from the voltage source Y and to the emitter from the voltage source V. Across the collector-emitter circuit is connected a diode network comprising the diodes D1 and D2. The junction of these diodes is connected to the additional capacitor ΔC and, furthermore, the emitter is connected to the output terminal 4.

To the input terminals 1, 2 is to be connected a direct current voltage source, the voltage of which controls the operation of the contact arrangement. The curve of this voltage is shown in FIG. 4*a*. After having passed the integrating or low-pass filter R, CR, the voltage U0 is obtained, see FIG 4*b*. On this voltage is superimposed the voltage obtained from the alternating voltage source U, whereby the voltage U1 results. The voltage U1 is also shown in FIG. 4*b*. In FIG. 4*c* the voltage U2 between the collector and the emitter of the transistor is shown. The transistor T will be completely conductive when the base voltage U1 exceeds the emitter voltage UT*r*. The voltage U2 will, consequently, appear each time the voltage U1 exceeds the threshold voltage UT*r*, the voltage of the emitter, see FIG 4*b*. In FIG. 4*c* is shown how the voltage U2 appears at the level *s*, while it is zero at level *b*. The capacitor ΔC will be connected to the oscillating circuit L, C during the periods of occurrence of the voltage U2.

The connection time of the voltage U2 can be varied partly by means of the time constant of the integration filter R, CR, and partly by change of the amplitude of the signal obtained from the alternating voltage source U.

The arrangement for the realization of the method of changing the frequency is not limited to the embodiment described above, as other embodiments of course are possible without changing the scope of the invention.

I claim:

1. A variable frequency oscillator comprising: an oscillation circuit having first and second terminals; an impedance having first and second terminals; means for connecting the first terminal of said oscillation circuit to the first terminal of said impedance; a voltage-operative switching circuit having a first terminal, a second terminal and a control-voltage input terminal; means for connecting the first terminal of said voltage-operative switching circuit to the second terminal of said impedance; means for connecting the second terminal of said voltage-operative switching circuit to the second terminal of said oscillation circuit; and a control voltage source connected to said control voltage input terminal, said control voltage source including means for generating a switching voltage which gradually changes between first and second amplitude levels and means for generating an AC voltage having a frequency much higher than the resonance frequency of said oscillation circuit and an amplitude smaller than the difference between said amplitude levels, said switching voltage and said AC voltage being added whereby said voltage-operative switching circuit closes to complete a circuit only when the sum voltage exceeds a given amplitude.

2. The apparatus of claim 1 wherein said impedance is a capacitor.

3. The apparatus of claim 2 wherein the means for connecting said capacitor to the first terminal of said voltage-operative switching circuit is a first diode, and further comprising a second diode connecting the junction of said first diode and said capacitor to the second terminal of said oscillation circuit.

4. The apparatus of claim 1 wherein said voltage-operative switching circuit comprises a transistor having emitter, collector and base terminals and means for applying operating potentials to said terminals, means for connecting said collector terminal to the second terminal of said impedance, means for connecting said emitter terminal to the second terminal of said oscillation circuit, and means for connecting said base terminal to said means for generating a switching voltage.

5. The apparatus of claim 2 wherein said switching voltage generating means comprises a DC voltage source that is switchable between on and off states, and an integrating circuit means including an input terminal connected to said DC voltage source.

6. The apparatus of claim 5 wherein said voltage operative switching circuit comprises a transistor having emitter, collector and base terminals and means for applying operating potentials to said terminals, means for connecting said collector terminal to the second terminal of said impedance, means for connecting said emitter terminal to the second terminal of said oscillation circuit, and means for connecting said base terminal to said means for generating a switching voltage.

7. The apparatus of claim 6 wherein said integrating circuit further includes an output terminal and said source of AC voltage is serially connected between the output terminal of said integrating circuit and the base terminal of said transistor.

8. The apparatus of claim 7 wherein said impedance is a capacitor.

9. The apparatus of claim 8 wherein the means for connecting the second terminal of said capacitor to the collector terminal of said transistor is a first diode, and further comprising a second diode connecting the junction of said first diode and said capacitor to the second terminal of said oscillation circuit.

References Cited

FOREIGN PATENTS 928,953 6/1963 Great Britain.

ROY LAKE, *Primary Examiner.*

S. H. GRIMM, *Assistant Examiner.*